United States Patent [19]

Gneuss

[11] Patent Number: 4,619,600
[45] Date of Patent: Oct. 28, 1986

[54] SIEVE DEVICE FOR CLEANING PLASTIC MELTS

[76] Inventor: Detlef Gneuss, Am Hofen Ufer 2a, 4970 Bad Oeynhausen 1, Fed. Rep. of Germany

[21] Appl. No.: 671,831

[22] Filed: Nov. 15, 1984

[30] Foreign Application Priority Data

Nov. 17, 1983 [DE] Fed. Rep. of Germany ....... 3341508

[51] Int. Cl.$^4$ .................. B29C 45/17; B29C 47/68
[52] U.S. Cl. ................... 425/197; 210/415; 210/791
[58] Field of Search .............. 210/413, 415, 791; 425/197–199

[56] References Cited

U.S. PATENT DOCUMENTS 4,257,901 3/1981 Rapp .................. 210/413
4,479,768 10/1984 Kube et al. .......... 425/198

FOREIGN PATENT DOCUMENTS 1047533 11/1966 United Kingdom ............ 425/197

Primary Examiner—Willard E. Hoag
Attorney, Agent, or Firm—Sprung Horn Kramer & Woods

[57] ABSTRACT

A sieve device for cleaning plastic melts in a high-pressure press consists of a known plate-like housing. The housing has a flowthrough bore that constitutes part of the flow channel of the press. The housing also has a sieve disk positioned in the flowthrough bore. A sieve-cleaning mechanism rests against the sieve disk. The mechanism consists of a plate, which has several perforations and which projects to some extent out of the housing. It is mounted upstream of the disk inside the housing and can move in such a way that at least one perforation is always in the flow channel and at least one perforation is always outside the housing. Contamination on the upstream side of a disk is removed by shifting the perforation being employed at a given moment out of the housing.

4 Claims, 6 Drawing Figures

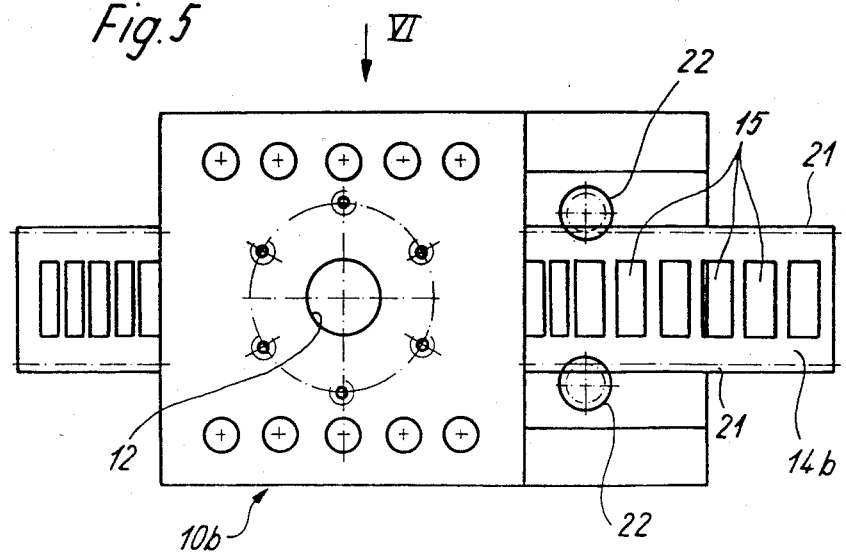
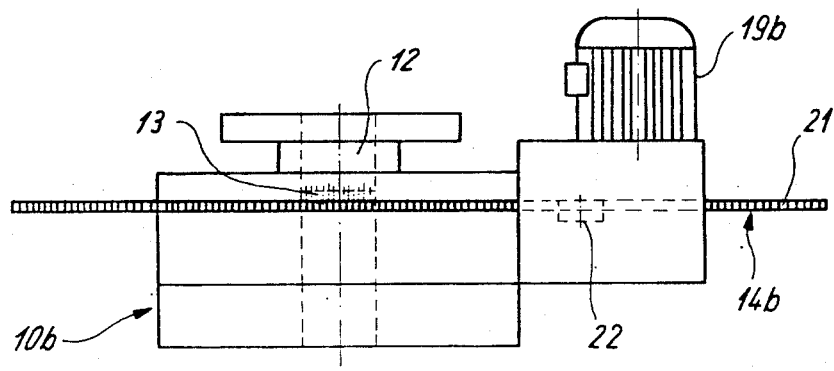

SIEVE DEVICE FOR CLEANING PLASTIC MELTS

BACKGROUND OF THE INVENTION

The present invention relates to a sieve device for cleaning plastic melts in a high-pressure press and consisting of a plate-like housing with a flowthrough bore that constitutes part of the flow channel of the high-pressure press and with a sieve disk positioned in the flowthrough bore.

Sieves of the this generic type are in themselves known.

It is also known that the sieve disks decompose relatively rapidly in long-term operation, especially when the plastic melt contains a relatively high proportion of contaminants, as when plastic waste is processed and not just pure granulate alone.

Sieve changers, of which various designs are known, have long been employed with sieve devices of this type. The sieve changers are in principle always disks or plates with several sieve disks that are introduced alternately into the flow channel, allowing both the positioning of a clean disk in the channel and the cleaning of a contaminated disk.

Although sieve changers of this type function unobjectionably, it is expensive to keep a number of separate sieve disks always available.

SUMMARY OF THE INVENTION

The object of the present invention is to provide a sieve device of the generic type that will ensure long-term operation without malfunction and without the need for a sieve changer.

This object is attained in accordance with the invention wherein a sieve-cleaning mechanism is provided that rests against the sieve disk 13 and that consists of a plate, which has several perforations and which projects to some extent out of the housing, and which is mounted upstream of the disk inside the housing and can move in such a way that at least one perforation is always in the flow channel and at least one perforation is always outside the housing.

This design allows mechanical cleaning of the sieve disk, which is positioned in the flow channel, in that, specifically, the perforations in the plate mechanically wipe off the contamination just upstream of the sieve disk to a certain extent as they move and force the contamination out of the flow channel, making it unnecessary in principle to replace the sieve disk itself on account of contamination alone.

The contamination that accumulates in the individual perforations can easily be removed while the contaminated perforation is outside of the housing.

Whereas a contaminated sieve disk has always had to be removed from the flow channel up to now and replaced with a clean disk, the sieve in the device in accordance with the invention will always remain operational and will be mechanically cleaned at predetermined intervals of time.

The plate can be circular and have several perforations positioned in it in an annular zone, in which case the perforations in the annular zone can be separated by webs, all curving in the same direction and the area of one web can measure about 10% of the total area of one perforation.

The plate can, however, be rectangular for example and slide inside the housing.

Some preferred embodiments of the invention will now be described with reference to the attached drawings, wherein

BRIEF DESCRIPTION OF THE DRAWINGS

FIG. 1 is a view of a sieve device along the direction that the melt flows in,

FIG. 5 is a view of a third embodiment of a sieve device along the direction of the melt flow, and FIG. 6 is a top view of the sieve device illustrated in FIG. 5 from the direction indicated by the arrow VI in FIG. 5.

DETAILED DESCRIPTION OF THE PREFERRED EMBODIMENTS

Figure 1:
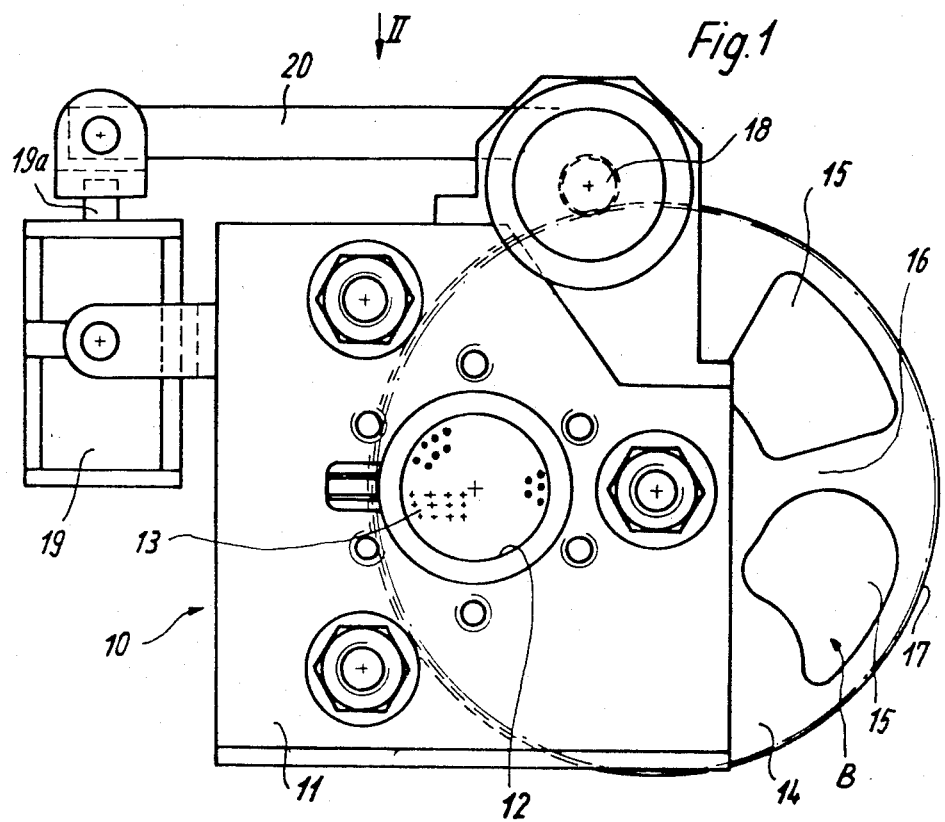
Figure 2:
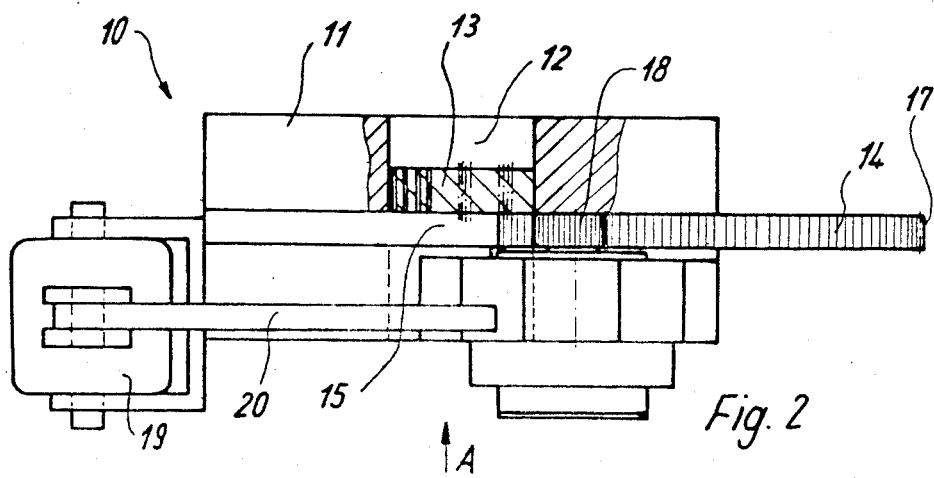
FIG. 2 is a top view of the sieve device illustrated in FIG. 1 from the direction indicated by the arrow II in FIG. 1.

The sieve device 10 illustrated in FIGS. 1 and 2 consists essentially of a plate-shaped housing 11, of a flowthrough bore 12, of a sieve disk 13 positioned in the bore, and of a plate 14 that has a number of perforations 15 and that is mounted in such a way that it can rotate inside the housing.

Sieve device 10 as a whole is employed in a known way on a high-pressure press for processing plastics with flowthrough bore 12 inside the channel that the plastic melt flows through. Thus, flowthrough bore 12 constitutes part of the flow channel in the press.

Plate 14 rests, as will be particularly evident from FIG. 2, directly against sieve disk 13 and specifically upstream of it. The direction of flow is indicated in FIG. 2 by arrow A. As will be particularly evident from FIGS. 1 and 2, plate 14 projects to some extent out of housing 11. Perforations 15 are distributed in such a way that at least one is always inside the flow channel and at least one is always outside housing 11. This distribution not only ensures that the flow channel is always unobstructed but also that one perforation 15 is always readily accessible for cleaning outside housing 11.

The function of this sieve device will now be described.

Contamination will accumulate on the upstream surface of sieve disk 13 during long-term operation. The accumulated contamination will be scraped off the disk as the perforation 15 that is at any moment in the vicinity of flowthrough bore 12 moves out, and will be conveyed outside housing 11, where it can be removed. The particular perforation 15 can now be returned to the flow channel or, in other words, flowthrough bore 12.

It is especially practical that plate 14 has enough perforations 15 for the effective cross-section of flowthrough bore 12 to be insignificantly decreased even when the circular plate 14 is in continous motion.

One way in particular of attaining this condition is to keep the web 16 between two adjacent perforations 15 relatively small. It is especially practical for the area of a web 16 between two perforations 15 to be about 90% smaller than the area of one of the perforations 15. Thus, when the perforations 15 in a plate 14 that is designed in this way are returned in continous operation to the vicinity of flowthrough bore 12, the small relative area of a web 16 will eliminate the risk of increased pressure in the flow channel.

The speed at which plate 14 rotates can be varied in accordance with the level of contamination in the melt, which depends finally of course on the type of plastic employed. The plate 14 is rotated by a pinion 18 engaging gear tooth 17 on plate 14. The pinion 18 is driven by a toothed lever 20. Lever 20 is driven by the piston rod 19a of a cylinder 19. Between the lever 20 and the pinion 18 is arranged a free-wheel means in such a way, that the pinion 18 is not rotated by the upwards directed movements of the piston rod 19a, but is rotated by the downwards directed movements of the piston rod 19a.

It is expressly emphasized that the basic shapes of the perforations 15 illustrated in FIG. 1 strictly represent potential embodiments by way of example, and that the perforations can just as well have other geometric shapes.

Especially practical, however, is an array of many perforations 15 shaped like the one indicated by arrow B in FIG. 1. The design can be completely described by stating that the perforations 15 are positioned in an annular zone and are separated by webs 16 that all curve in the same direction.

Furthermore, although FIG. 1 illustrates only three perforations 15, with two outside housing 11 and one inside flowthrough bore 12, it is to be understood that the nature of the drawing has been dictated by considerations of simplicity and that a plate 14 can in practice have a much higher number of perforations.

It is also conceivable for a rectangular, for example, plate 14 with a large number of perforations 15 to be employed instead of a circular plate and to slide instead of rotate inside housing 11. If the plate is rectangular, the individual perforations 15 will be displaced by sliding the plate longitudinally. A round plate, however, is more practical because it is easier to drive in continuous operation than a rectangular plate, which must ultimately be considered a slide.

Figure 3:
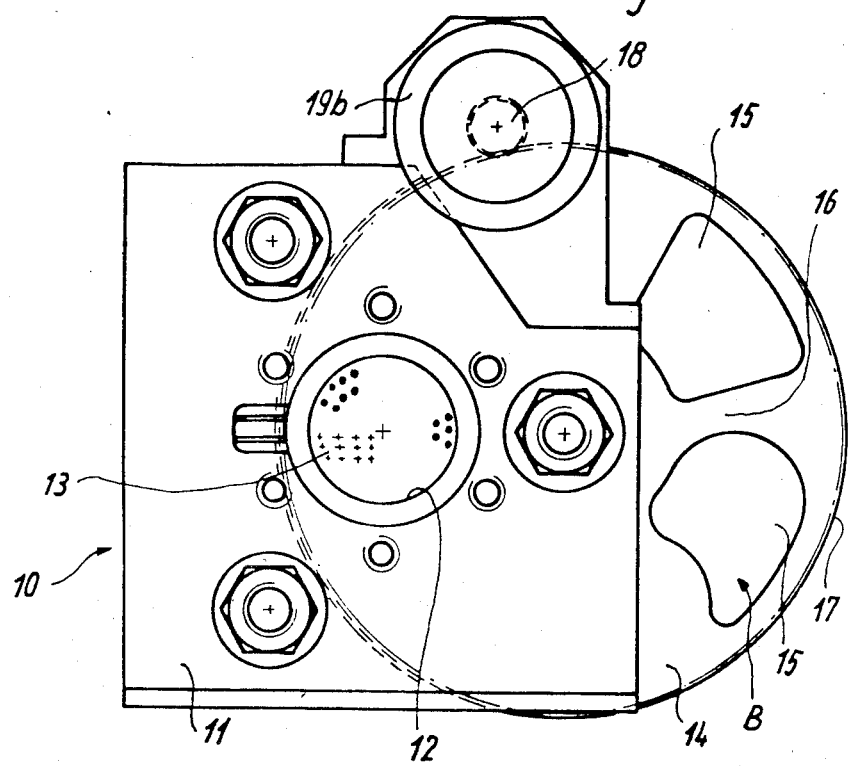
FIG. 3 is a view of a second embodiment of a sieve device along the direction of the melt flow.
Figure 4:
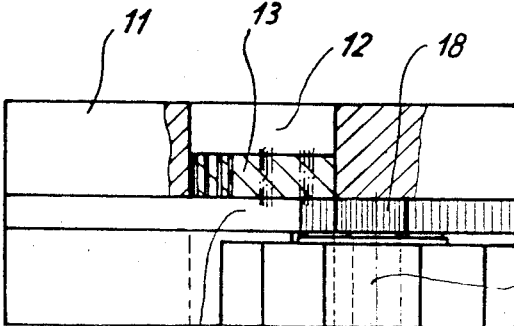
FIG. 4 is a top view of the sieve device illustrated in FIG. 3 from the direction indicated by the arrow IV in FIG. 3.

In the second embodiment of such a sieve device, shown in FIGS. 3 and 4, the pinion 18, which rotates the plate 14, is driven directly the motorshaft 20a of a motor 19b.

In the third embodiment of such a sieve device, shown in FIGS. 3 and 4, the plate 14b is in the form rectangular area. Its longitudinal sides have a toothing 21, engaged by two pinions 22, which are driven by a motor 19b. By rotation of motor 19b and the pinions 22 the plate is translatorily by displaced in direction of its longitudinal axis within the housing 10b.

It will be appreciated that the instant specification and claims are set forth by way of illustration and not limitation, and that various modifications and changes may be made without departing from the spirit and scope of the present invention.

What is claimed is:

1. In a sieve device for cleaning plastic melts in a high-pressure press and having a plate-like housing with a flowthrough bore that constitutes part of a flow channel of the high-pressure press and a sieve disk positioned in the flowthrough bore, the improvement comprising sieve-cleaning means including a plate that rests against the sieve disk on the upstream side thereof and has several perforations therein, separated by webs, each measuring about 10% of the total area of one perforation, wherein the plate is disposed in the housing and projects to some extent out of the housing, and means mounting the plate for movement to align at least one perforation in the flow channel and while at least one perforation is outside of the housing.

2. The sieve device as in claim 1, wherein the plate is circular and has several perforations positioned in it in an annular zone.

3. The sieve device as in claim 2, wherein the perforations in the annular zone are separated by the webs, all curving in the same direction.

4. The sieve device as in claim 1, wherein the plate is rectangular and slides inside the housing.

* * * * *